United States Patent [19]
Vattier

[11] 3,979,098
[45] Sept. 7, 1976

[54] SUPPORT FOR SECURING A SLAB TO AN UPRIGHT

[76] Inventor: Claude Louis Albert Vattier, Rue Lavoisier, 76260 Eu, France

[22] Filed: Aug. 5, 1975

[21] Appl. No.: 601,990

[30] Foreign Application Priority Data
Aug. 7, 1974   France .............................. 74.27400

[52] U.S. Cl. .............................. 248/247; 108/106; 108/156; 211/135; 248/188
[51] Int. Cl.² ........................................... A47B 3/06
[58] Field of Search ........... 248/247, 248, 235, 188, 248/222, 221; 108/106, 109, 156; 211/148, 134, 153, 135

[56] References Cited
UNITED STATES PATENTS

| | | | |
|---|---|---|---|
| 450,289 | 4/1891 | Gottfried | 108/106 |
| 3,100,572 | 8/1963 | Gingher et al. | 211/153 |
| 3,339,504 | 9/1967 | Schreyer | 248/188 X |
| 3,747,540 | 7/1973 | Salkoff | 248/222 |

FOREIGN PATENTS OR APPLICATIONS

| | | | |
|---|---|---|---|
| 1,142,107 | 9/1957 | France | 211/148 |
| 1,289,048 | 2/1962 | France | 108/156 |
| 833,085 | 4/1960 | United Kingdom | 211/134 |

*Primary Examiner*—J. Franklin Foss
*Attorney, Agent, or Firm*—Edwin E. Greigg

[57] ABSTRACT

A support for a slab or tray intended to be secured to an upright, such as a metallic leg of a table including at least two trays. The support has the general shape of a triangle of which the top of the corner adjacent to the leg has a suitable profile adapted to mate closely with part of the half-periphery of the leg, while each of the sides adjacent to the profile bears a substantially right-angled flange. The fixing of the support to the leg is effected either by welding or by screwing through a small plate fixed to said support. The invention is particularly apt for the construction of tea trolleys, occasional tables and television stands.

10 Claims, 5 Drawing Figures

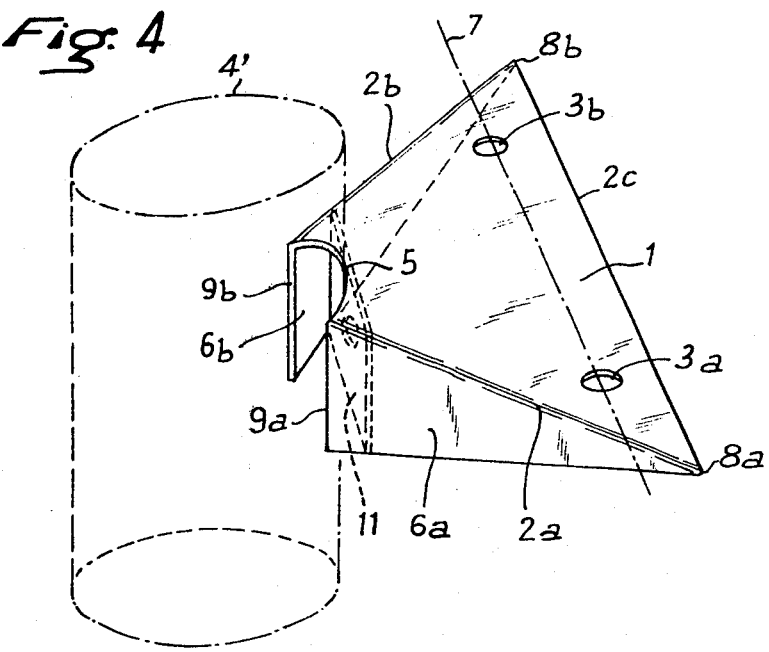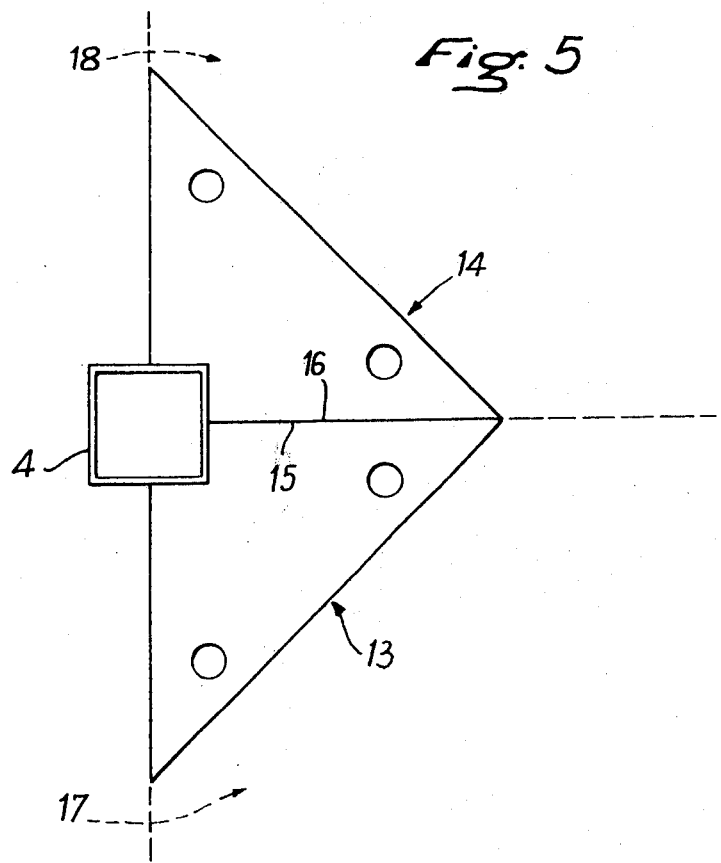

SUPPORT FOR SECURING A SLAB TO AN UPRIGHT

BACKGROUND OF THE INVENTION

The invention relates to a support for a plate, slab or tray intended to be secured to an upright element, column, pillar or post, such as a metallic leg of a table having at least two trays, of the type of a trolley, an occasional table, a television stand or the like.

Numerous models of tables with metallic legs, generally tubular, exist and they include a top and one or several trays or shelves distributed over the height of the legs. Mostly the legs form part of a tubular metallic frame, stable by itself, comprising longitudinal and lateral cross-members on which are fixed slabs generally of wood or of "laminated" or of "composite" materials.

In order to reduce its cost price and the bulk of the table when disassembled, it is known to eliminate the cross-members and to fix the trays directly on supports borne rigidly and laterally by the legs. The horizontal stability of the assembled table then depends upon the rigidity of the trays, the top tray replacing, for this purpose, the upper longitudinal and lateral cross-members and the lower tray replacing the cross-members between the legs.

However this horizontal stability is often insufficient when the table is heavily loaded, for example by a television set, on account of the elastic flexibility of the supports fixed to the legs. This elastic deformation of a support occurs at its surface which is in contact with the underneath of the tray. To prevent this deformation, the bearing surface of the support and the lower surface of the tray must be made perfectly fast to one another, that is to say, in the most general case where the fixing of the trays to the support is effected by screwing, at least three non-aligned screw positions must exit. Even if such an arrangement is sufficient when the trays are made of hard wood, this is not the case when the trays are of soft wood or cut out from a panel of less homogeneous material, such as compacted chipwood. In the latter case, the differences in distance between the points of application of the load and the positions of the fixing screws, make the bearing surface of each support tend to flex along a line joining the screws closest to the point of application, whilst the one or more other screws are partially pulled out and assume a "play" rendering them useless.

OBJECTS AND SUMMARY OF THE INVENTION

It is therefore an object of the present invention to provide an improved support having only two screw-fixing positions, but which on the one hand is firmly shouldered against the corresponding upright and, on the other hand, has lateral flanges ensuring the rigidity of the supporting surface.

It is another object to provide an improved table incorporating a support according to the invention.

Another object is to provide an improved shelving construction incorporating a support according to the invention.

These and other objects are accomplished according to the present invention by the provision of a support for a slab intended to be made fast to an upright member such as a metallic table leg, having a bearing surface in the general shape of a triangle, preferably isoceles, of which the apex of the angle adjacent the leg has a suitable profile arranged to mate closely with part of the half-periphery of the leg, having two openings for the passage of fixing means for the slab arranged on said surface along a line substantially parallel to the side of the triangle opposite said angle, and wherein each of the sides adjacent to the latter has a flange formed substantially at right-angles, extending from the edge of the profile of the apex to a point of the side concerned, situated, at least slightly, beyond the line of the openings with respect to said apex, the end sections of the flanges, adjacent the profile being arranged so as to be supported on the upright substantially along two generators of the latter, means being also provided for fixing the support to the upright.

The securing of the support to such an upright of metal can be effected notably by welding or by screwing as will be seen below.

BRIEF DESCRIPTION OF THE DRAWINGS

The invention will be better understood and other features will be apparent on reading the description which follows and on studying the accompanying drawings, showing some specific embodiments of the invention, which are not however to be considered as limiting.

In the drawings:

FIG. 4 shows another embodiment of a support according to the invention for fixing to a cylindrical tubular leg.

FIG. 5 is an end view of a tubular leg with square cross-section furnished with two supports, similar to those of FIGS. 1 to 3, arranged on two successive corners of the leg.

DESCRIPTION OF THE PREFERRED EMBODIMENTS

Figure 1:
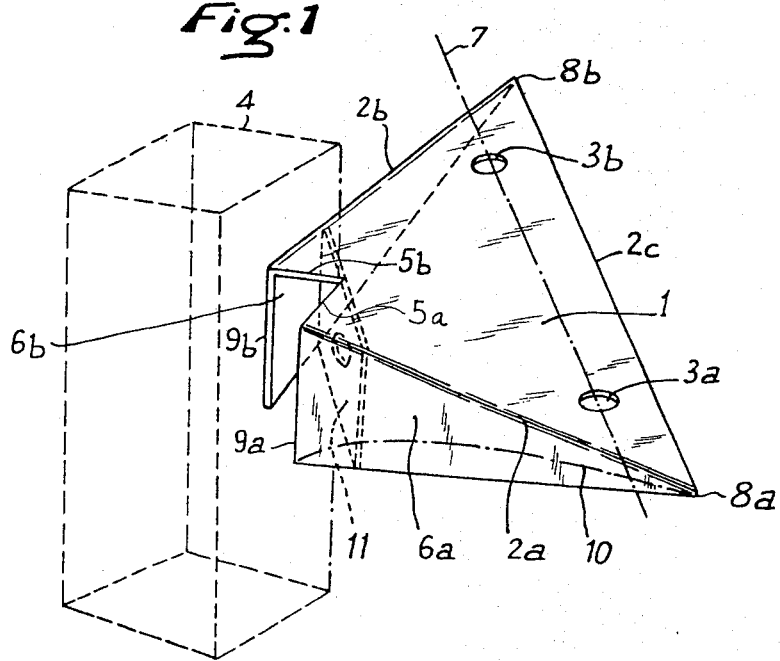
FIG. 1 is a perspective view of one embodiment of a support for a slab intended to be fixed on a corner of a tubular leg of square cross-section.
Figure 3:
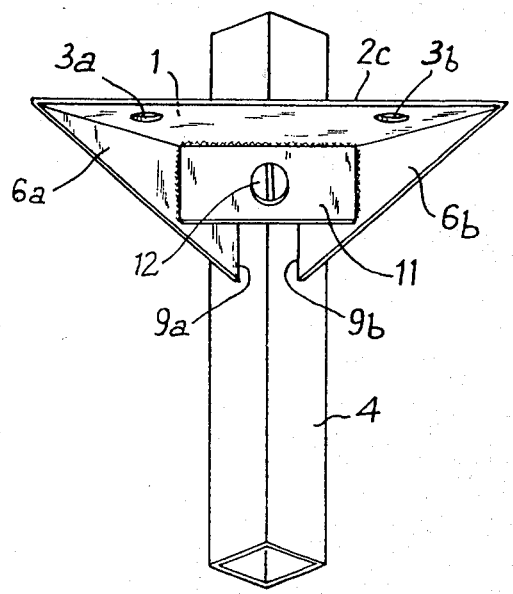
FIG. 3 is another perspective view of the embodiment of FIG. 1 fixed by screwing to a tubular leg of square section.
Figure 2:
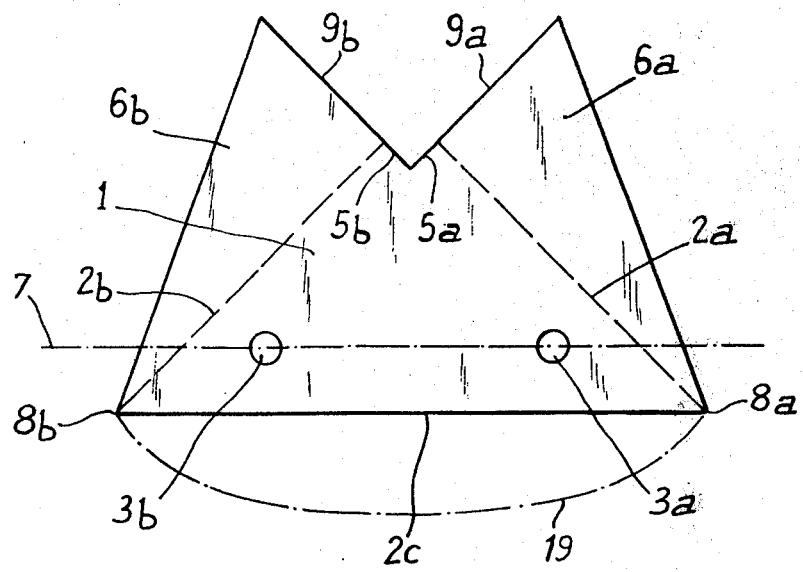
FIG. 2 shows the embodiment of the support of FIG. 1 opened out.

FIGS. 1, 2 and 3 show a slab support for a table with a metallic legs. Said support has a bearing surface 1 having the general shape of a rectangular isoceles triangle of which the two sides to the right-angle are denoted by 2a and 2b and the hypotenuse by 2c. This bearing surface is pierced by two openings 3a and 3b intended to receive screws for fixing the slab, their line 7 being substantially parallel to the hypotenuse 2c. The apex of the right-angle is cut-out to form a profile which mates closely with part of the half-periphery of the table leg, and perferably a quarter of said periphery.

In the examples shown in FIGS. 1, 2 and 3, the leg is constituted by a tube with a square cross-section 4 (shown in discontinuous line in FIG. 1) and the profile is formed by a notch with perpendicular edges 5a and 5b arranged to fit on respective sides of a corner of said leg.

Of course, the tube can have any cross-section, and notably circular as is shown in FIG. 4 in which elements similar to those of FIGS. 1 to 3 bear the same reference numerals. In this example, the notch is then bounded by a curve 5 corresponding to the portion of the section of the cylindrical tube 4' with which it must mate.

On each of the sides 2a and 2b, the support is provided with a right-angled flange 6a, 6b, extending from the corresponding edge 5a, 5b or 5 (FIG. 4) of the notch up to a point 8a, 8b located slightly beyond the line 7 with respect to said notch. In the examples shown the points 8a and 8b coincide with the ends of the hypotenuse 2c. The end sections 9a, 9b of the flanges in line with the notch are perpendicular to the plane of the bearing surface 1 and ensure firm shouldering of the support on the leg 4, 4'. In FIGS. 1 and 3 the end sections 9a and 9b of the flanges are supported substantially on median longitudinal lines of the two sides adjacent to the fixing corner.

The fixing of the support to said leg is obtained either by a line of welding 9a, 5a, 5b, 9b, or by screwing. To effect the latter method of fastening, a flat element 11 (FIGS. 1, 3 and 4) is welded beneath the bearing surface 1 substantially in a plane which is perpendicular to the latter, parallel to the hypotenuse 2c of the rectangular triangle and which passes in the vicinity (preferably the immediate vicinity, of the bottom of the profile of the apex of said triangle. In the embodiment of FIGS. 1 and 3, the plane of the flat element passes through the meeting point of the edges 5a, 5b of the profile, whilst in the embodiment of FIG. 4, said plane is tangential to the circular profile 5.

The flat element 11 is pierced by an aperture through which passes a screw 12 (FIG. 3), coming into engagement with the wall of a suitable hole, if necessary tapped, formed in the corner of the tube 4 or in the cylindrical well of the tube 4', the flat element 11 being borne on the corner concerned of the tube 4 or respectively on a generator of the tube 4'.

The previously described screwing of the flat element 11 to the tubular leg 4 also effects the close application of the end sections 9a, 9b of the flanges 6a, 6b respectively along two generators of this leg.

The above-described features thus ensure rigid connection between the support and the leg and very great rigidity of the bearing surface bounded, opposite the leg, by the line 8a – 8b.

In addition, when the slab which has of course a notch corresponding to the notch 5a, 5b, is screwed on the support, a heavy load placed on the central portion of said slab tends to depress the latter. At the level of the support, the corner of the slab hence tends to lift around the line 8a – 8b (here coincident with the hypotenuse 2c). The screws passing through the openings 3a, 3b resist this action and are not pulled out even if the core of the slab is relatively friable since, as has been stated, the distance separating the line 7 from the line 8a– 8b is short.

All of the foregoing statements remain true whatever the shape of the flanges or of the table leg. The flanges 6a and 6b are shown with a regularly decreasing height from the edge of the profile but can have, for example, a more particular shape such as that drawn in the mixed line 10 (FIG 1).

Similarly the support can be extended beyond the line 8a – 8b, its extreme edge being possibly a broken line or any sort of curve, such as that shown by mixed line 19 in FIG. 2. In th latter case, a very heavy load can cause a very slight elastic deformation of the end zone of the bearing surface comprised between the lines 19, and 8a – 8b, but the latter still represents the line of strength around which only could be produced the lifting of the corner of the slab and the possible effect on the screws remains slight as a result of the short distance of this line from the line 7. The extracting force on the screws is even reduced with respect to the foregoing embodiment due to the elastic reaction of the end zone of the support.

FIG. 5 shows a particular embodiment of the use of supports according to the invention.

The square cross-sectioned tubular pillar 4 seen from the end, is furnished with two supports 13 and 14 secured as described above on two consecutive corners of said pillar and at the same level. Thus, the flanges 15 and 16 respectively of the supports 13 and 14 are applied against one another. This feature permits a table to be designed provided on the top of at least two slabs shown in discontinuous line at 17 and 18 and obviously notched in the same way as the supports. It is thus possible to envisage any sort of assembly, the slab 17 or 18 constituting for example an extension of a table formed by the slab 18 or 17 respectively, in which case of course, two additional pillars are provided at the end of the extension slab.

FIG. 5 is given only by way of example and it is also conceivable to fix a third support on another edge of the pillar, so as to install a slab which extends perpendicularly to the two first ones 17 and 18. Any type of shelving is particularly easy to construct, the pillars used being then, for example, provided with holes regularly spaced over their height. Besides fixed slabs, removable intermediate shelves can obviously be provided.

The examples described have supports whose bearing surface has the general shape of a rectangular isoceles triangle, but is quite obvious that this can be any other shape. Notably, it is entirely possible to imagine, for example, an isoceles triangular table with three legs provided with supports according to the invention, in which case said supports would clearly have an angle at the apex of 60°.

Moreover, the examples relate particularly to tables whose legs are substantially perpendicular to the slabs or trays with which said tables are provided. It is not however excluded to conceive supports according to the invention for pillars arranged otherwise, in which case the flat screwing element of a support, without being perpendicular to the bearing surface, is at least parallel to the axis of the pillar concerned, the flanges then being of appropriate shape.

It is quite obvious that other modifications can also be introduced without departing from the scope of the invention. Thus the uprights can be of oval cross-section. Also the fixing at a corner on rectangular or square tubular uprights is only one particular embodiment. In fact, another particularly advantageous embodiment consists of arranging the supports so as to position them on the flat surfaces of the uprights and to secure them by screwing or by welding. For uprights with a square crosssection the slabs, suitably cut-out at the corners, then have in this case, edges substantially parallel to the diagonal planes of said upright. This feature enables notably the easier construction of assemblies with several slabs arranged at the same level, similar to that described in connection with FIG. 5. Similarly the uprights and supports are not necessarily made of metal; plastics materials which are of sufficient rigidity and are fastenable by screwing and/or by welding may also be employed.

What is claimed is:

1. Support for securing a slab to an upright, said support comprising a bearing surface having the general shape of a triangle of which the apex of one angle is positionable adjacent the upright and has a suitable profile arranged to mate closely with part of the half-periphery of the upright, said bearing surface having two openings for the passage of slab-fixing means arranged on said surface along a line substantially parallel to the side of the triangle opposite said angle, each of the sides of the triangle adjacent said angle having a flange formed substantially at right-angles to said bearing surface, extending from the edge of said profile to a point on the side concerned situated at least slightly beyond the line of said openings with respect to the apex, the end sections of the flanges adjacent the profile being arranged so as to be supportable on the upright substantially along two generators of the latter, said support also comprising fastening means for securing the support to the upright.

2. Support according to claim 1, wherein the bearing surface extends beyond the line joining the end points of the flanges whilst remaining inscribed within the angle formed by the lateral sides of the triangle.

3. Support according to claim 1, wherein the fastening means are constituted by linear welding along the edges of the profile and the end sections of the lateral flanges.

4. Support according to claim 1, wherein the fastening means are constituted by a flat element welded beneath the bearing surface in a plane substantially parallel to the axis of the upright and passing in the vicinity of the bottom of the profile, said flat element having an aperture for the passage of securing means engageable with a suitable hole formed in the corresponding portion of the upright.

5. Support according to claim 4, for mating closely with the corner of an upright constituted by a tube of rectangular cross-section, wherein the profile has right-angled edges and the aperture of the flat element is arranged to face a corresponding hole formed in the corner of the upright, whilst the end sections of the flanges are adapted to be supported on the upright along lines substantially parallel to said corner.

6. Support according to claim 1, for mating closely with an upright of curved cross-section, said profile being of corresponding arcuate form.

7. Support according to claim 1, wherein said triangle is an isoceles triangle.

8. Support according to claim 4, wherein said plane is in the immediate vicinity of the bottom of the profile.

9. A table comprising a plurality of uprights supporting a plurality of slabs fastened to said uprights through a plurality of supports as defined in claim 1.

10. A shelving structure comprising a plurality of uprights supporting a plurality of slabs fastened to said uprights through a plurality of supports as defined in claim 1.

* * * * *